United States Patent [19]

Peascoe

[11] 4,202,948
[45] May 13, 1980

[54] IMPACT-RESISTANT THERMOPLASTIC COMPOSITION BASED ON GRAFT COPOLYMER

[75] Inventor: Warren J. Peascoe, Woodbridge, Conn.

[73] Assignee: Uniroyal, Inc., New York, N.Y.

[21] Appl. No.: 836,643

[22] Filed: Sep. 26, 1977

[51] Int. Cl.$^2$ ............................................. C08L 51/06
[52] U.S. Cl. ............................................. 525/70; 525/77
[58] Field of Search .......................... 260/878 R, 876 R

[56] References Cited

U.S. PATENT DOCUMENTS

| | | | |
|---|---|---|---|
| 3,489,821 | 1/1970 | Wilt et al. | 260/878 R |
| 3,538,190 | 11/1970 | Meredith et al. | 260/878 R |
| 3,538,192 | 11/1970 | Bishop, Sr. | 260/878 R |
| 3,657,395 | 4/1972 | Meredith et al. | 260/878 R |
| 3,671,608 | 6/1972 | Meredith et al. | 260/878 R |
| 3,819,765 | 6/1974 | O'Shea | 260/878 R |
| 3,849,518 | 11/1974 | Severini et al. | 260/878 R |
| 3,893,968 | 7/1975 | Shega et al. | 260/878 R |

FOREIGN PATENT DOCUMENTS

| | | | |
|---|---|---|---|
| 48-32189 | 10/1973 | Japan | 260/878 |
| 48-32585 | 11/1973 | Japan | 260/878 |

*Primary Examiner*—J. Ziegler
*Attorney, Agent, or Firm*—James J. Long

[57] ABSTRACT

A thermoplastic composition characterized by high impact strength and flex-resistance, based on a graft copolymer of resin-forming monomer (e.g., styrene-acrylonitrile) on EPDM type of rubber (especially a terpolymer of ethylene, propylene and 5-ethylidene-2-norbornene) having a Mooney viscosity of at least 55 ML-4 at 257° F. and an iodine number of at least 15.

2 Claims, 3 Drawing Figures

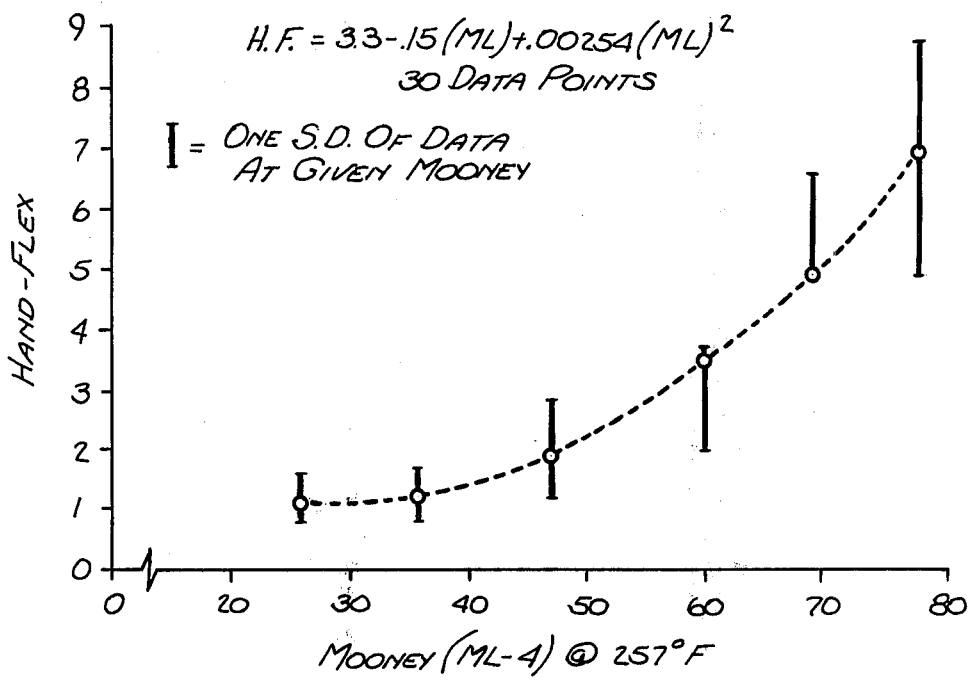
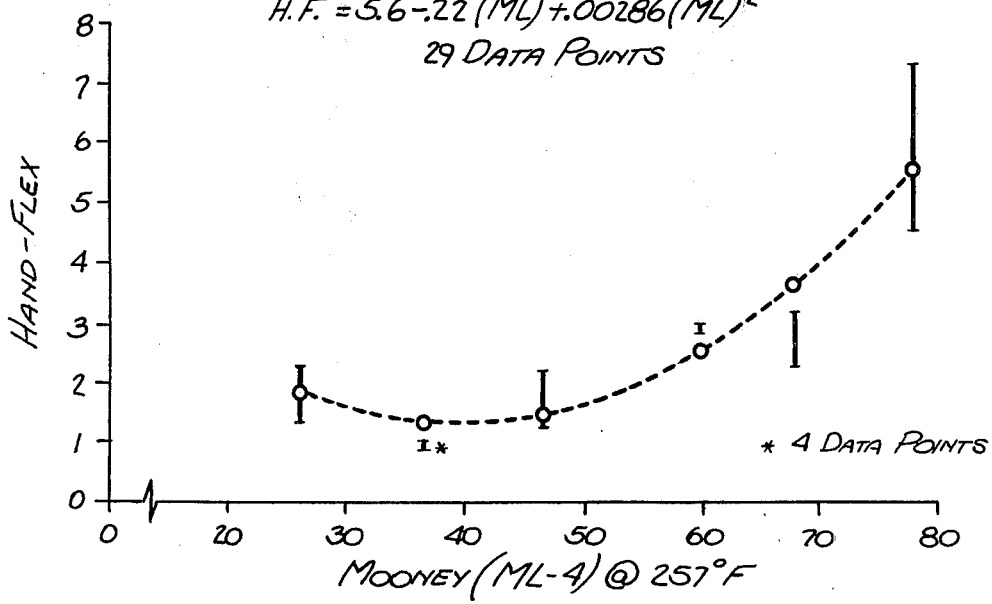

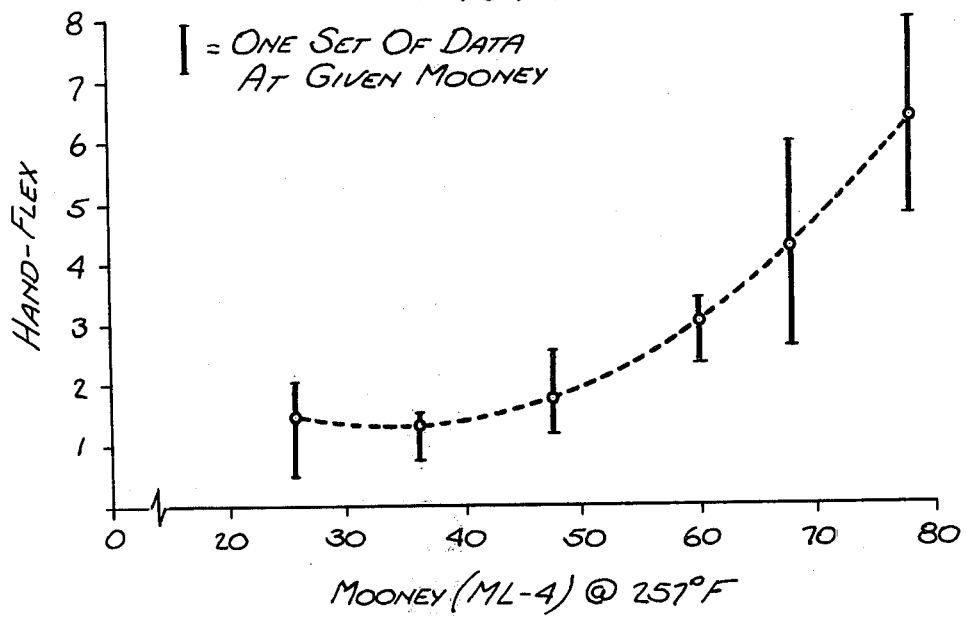

IMPACT-RESISTANT THERMOPLASTIC COMPOSITION BASED ON GRAFT COPOLYMER

This invention relates to an impact-resistant thermoplastic material based on graft copolymer.

It has previously been proposed to provide impact-resistant thermoplastic compositions based on blends of graft copolymers of resin-forming monomeric material on unsaturated ethylene-propylene-non-conjugated diene ("EPDM") terpolymer rubber spine, with separately prepared resin, e.g., styrene-acrylonitrile resin. For example, in U.S. Pat. No. 3,489,821, Witt and Paddock, Jan. 13, 1970 there is disclosed a blend having a certain amount of ability to be bent without failing, as evidenced by a hand flex wherein a 0.1 inch thick specimen is bent through an angle of up to 180° by hand without failing. While such compositions are satisfactory for some purposes, it has unfortunately been found in practice that such prior compositions are unsatisfactory for certain applications where the manufactured part must take occasional deformations beyond the yield point and retain its general shape without breaking. For example, luggage, plastic cases and tote boxes must stand up to hard use and occasional deformation beyond the yield point and must be capable of resuming their original shape without cracking or breaking. High impact strength, notched or unnotched, is essential but not enough; likewise the ability to pass the simple hand flex test described in U.S. Pat. No. 3,489,821 is not enough. The present invention is directed to a high impact strength composition which is capable of passing a much more severe hand flex test, performed by taking a sample of stock, extruded through a die 0.125" thick and 1.0" wide, bending a section about four inches long initially through an angle of 180° upon itself, then immediately bending it through an angle of 360° in the reverse direction upon itself, and repeating the process. In accordance with the invention it has been found that when the spine rubber employed in making the graft copolymer portion of the blend is an EPDM terpolymer having a Mooney viscosity of at least 55 ML-4 at 257° F. and an iodine number of at least 15, the blend exhibits high notched impart strength and is capable of undergoing repeated flexing in the severe hand flex test without failure.

Other prior practices are disclosed in U.S. Pat. No. 3,849,518, Severini et al., Nov. 19, 1974, which shows in Example 3 a blend in which the graft copolymer is made using a solution polymerization process and contains 35% by weight of ENB-EPDM and 65% by weight of a 65/35 styrene/acrylonitrile resinous copolymer. This graft is then mixed with 75/25 styrene/acrylonitrile resin to give an overall resin/rubber ratio of 80/20. In this case the iodine number of the rubbery spine is about 20. No Mooney viscosity is given. However, the intrinsic viscosity in cyclohexane at 30° is 2.75. Additionally it is stated in column 2, line 70 and 3, lines 1 and 2 that "these terpolymers have . . . a molecular weight of 50,000 to 800,000, preferably 70,000 to 500,000." The present invention employs, in making the graft copolymer, a spine rubber having a high Mooney viscosity of at least 55 ML-4 at 257° F. with an iodine number of at least 15, and most preferably uses, in making the graft copolymer, an amount of resin-forming monomer approximately equal to the amount of spine rubber. This unique combination of features, which is not shown by Severini et al., leads to a product having a surprising combination of desirable physical properties such as tensile strength, Rockwell hardness, gloss, die swell, including, unexpectedly, a high resistance to failure in flexure and a high notched impact strength.

The invention will be described with reference to the accompanying drawings, wherein:

FIG. 1 is a graph showing the relationship between Mooney viscosity and flex resistance in compositions based on graft copolymers made by a mass polymerization process;

FIG. 2 is a similar graph, involving compositions based on graft copolymers made by an aqueous slurry process; and FIG. 3 is a similar graph based on the combined results of FIGS. 1 and 2.

The invention is concerned with a thermoplastic graft copolymer composition characterized by high impact strength, and high resistance to failure from flexing, comprising:

(a) a resinous polymer of monoethylenically unsaturated resin-forming monomeric material; and (b) a rubbery polymer of two different linear alpha-monoolefins, one of which is ethylene and the other of which is a higher alpha-monoolefin having 3 to 16 carbon atoms, and a copolymerizable non-conjugated diene, said rubbery polymer (b) having a Mooney viscosity of at least 55 ML-4 at 257° F. and an iodine number of at least 15, the weight ratio of the resin (a) to the rubber (b) being from the 95/5 to 30/70, and at least 2% by weight of the resin (a) present in the composition having been formed in situ in the presence of the said rubber (b). If desired, all of the resin (a) present in the composition may be formed in situ in the presence of the rubber (b). More usually, from 2 to 60% by weight of the resin (a) present in the composition is formed in situ in the presence of the rubber (b), and the remaining 98 to 40% by weight of the resin (a) is formed separately in the absence of the rubber (b).

Accordingly, the invention in one preferred aspect relates to an improved hard, tough, rigid, flexure-resistant composition comprising a mixture of a hard, brittle polymer or resin and separately prepared, relatively soft rubbery graft copolymer, and is based on the discovery that by using, to make the graft copolymer, a spine rubber having a Mooney viscosity of at least 55 ML-4 at 257° F. and an iodine number of at least 15, there is produced a blend which passes the unusually severe hand flex test described herein and which exhibits an unexpectedly high notched impact strength.

In another aspect, the invention is concerned with employing in the graft copolymer approximately equal weights of resin and rubber so as to achieve in the blend an optimum combination of such physical properties as tensile strength, Rockwell hardness, gloss, die swell, notched impact strength and resistance to failure in flexure.

The resins suitable for use in this invention include the hard rigid homopolymers and copolymers of monoethylenically unsaturated monomers such as styrene, halostyrenes, alpha-methylstyrene, para-methylstyrene, acrylonitrile, methacrylonitrile, acrylic acid, methacrylic acid, maleic anhydride, the lower (1-8 carbon atoms) alkyl esters of acrylic acid and methacrylic acid and the like. Resins of particular interest are polystyrene, polymethyl methacrylate, copolymers of styrene-acrylonitrile, styrene-methyl methacrylate, styrene-methacrylic acid; similar copolymers of alpha-methylstyrene and copolymers of styrene-alpha-methylstyrene and the like. These resins and methods for their preparation are well known.

In many cases the monomeric material on which the resin is based is selected from the group consisting of alkenyl aromatic monomers, vinyl and vinylidene halides wherein the halogen thereof is selected from the group consisting of fluorine, chlorine and bromine, acrylic monomers and mixtures thereof, the alkenyl aromatic monomer being selected from the group consisting of alkenyl aromatic hydrocarbons having 8–20 carbon atoms and in which the acrylic monomer has the general formula

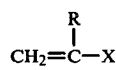

wherein R is selected from the group consisting of hydrogen and alkyl groups having 1–5 carbon atoms and X is selected from the group consisting of

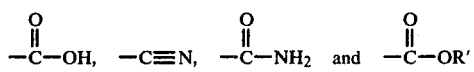

wherein R' is an alkyl group having 1–9 carbon atoms (see U.S. Pat. No. 3,538,190, Meredith et al., Nov. 3, 1970, col. 2, line 55 to col. 3, line 30). Almost invariably the alkenyl aromatic monomer is selected from the group consisting of styrene, alpha-methylstyrene, chlorostyrene and vinyl naphthalene and the acrylic monomer is selected from the group consisting of acrylonitrile, methacrylonitrile, methacrylic acid, acrylic acid, and methyl, ethyl, propyl and isopropyl methacrylates. Usually a mixture of at least one such alkenyl aromatic monomer (preferably styrene or alpha-methylstyrene or both) and at least one such acrylic monomer (preferably acrylonitrile) is used in making the resin. Frequently the ratio of styrene-type monomer to acrylic-type monomer is from 80/20 to 65/35, by weight, and the intrinsic viscosity in dimethylformamide at 30° C. is at least 0.40.

The relatively soft, rubbery graft copolymers suitable for use in this invention are those made by graft polymerizing a resin-forming, monoethylenically unsaturated monomer or a mixture of monomers onto a rubbery copolymer. The rubbery copolymers include the high Mooney (e.g., up to 120 or more ML-4 at 257° F.) copolymers of at least two different straight-chain alpha-monoolefins such as ethylene, propylene, butene-1, octene-1 and the like with at least one other copolymerizable monomer, usually a diene, typically a non-conjugated diene. Preferably one of the alpha-monoolefins is ethylene along with another higher alpha-monoolefin. The weight ratio of the ethylene to the higher alpha-monoolefin in the rubbery terpolymer is ordinarily within the range of from 20/80 to 80/20. Particularly preferred copolymers are the ethylene-propylene-nonconjugated diene ternary copolymers in which the nonconjugated diene is 5-methylene-2-norbornene, 5-ethylidene-2-norbornene, 5-isopropylidene-2-norbornene and the like. The amount of the diene should be such that the iodine number of the rubbery terpolymer is in the range of from about 15 to about 40, preferably about 20 to about 35, which corresponds to about 7 to 20 weight percent, preferably about 9 to 17 weight percent, of diene monomer units in the rubbery terpolymer. Examples of graft copolymerization methods suitable for use herein are described in U.S. Pat. No. 3,489,822, Witt and Paddock, Jan. 13, 1970; U.S. Pat. No. 3,642,950, O'Shea, Feb. 15, 1972; and U.S. Pat. No. 3,849,518, Severini et al., Nov. 19, 1974; and Japan Pat. No. 48/32189, Showa Denko, Oct. 4, 1973, the disclosures of which are incorporated herein by reference. It will be understood that in the graft copolymerization process not all of the resin-forming monomer actually becomes grafted onto the rubber spine. Some of the monomer simply forms free resin in situ, which is present in physical mixture with the true graft. The amount of grafted-on monomer in the graft polymerization product may be determined by extracting the product with a solvent for the ungrafted resin (e.g., acetone). The extracted resin (free resin) subtracted from the total resin gives the grafted resin. The weight ratio of grafted resin to rubbery spine in the present products is ordinarily at least 0.2.

Frequently the rubbery spine used in making the graft copolymer is a copolymer of ethylene, at least one alpha-monoolefin containing 3 to 16 carbon atoms and at least one copolymerizable polyene, especially a non-conjugated diene, whether aliphatic as in 1,4-hexadiene or preferably bridged ring cyclic as in dicyclopentadiene, bicyclo (2.2.1) hepta-2,5-diene, and the alkylidene norbornenes, especially the 5-alkylidene-2-norbornenes wherein the alkylidene group contains 1–10 carbon atoms, as disclosed in the references referred to above.

For improved resistance to hand flexure of the blend the Mooney viscosity (ML-4) of the rubbery terpolyer spine as measured at 257° F. must be at least 55. The 257° temperature is the preferred temperature for measurement of the Mooney because at this temperature the effects of crystallinity due to the blocks of ethylene have disappeared.

For optimum notched impact strength of the blend, especially when during the mixing process the mixture of resin and graft copolymer is subjected to high shear forces at elevated temperatures, as for example in a high shear extruder mixer, it has been found that the iodine number which is a measure of the unsaturation of the rubbery terpolymer spine must be at least 15. For those terpolymer spines in which the iodine number is below 15, the notched impact strength of the blend is dependent on the severity of the shear forces generated during the mixing process. This dependency is an inverse relationship wherein highly severe shear force results in low notched impact strength and mild shearing force results in high notched impact strength.

The monoethylenically unsaturated monomer or mixture of monomers that may be used for grafting onto the rubbery terpolymer to make the graft copolymer may or may not be the same as that used in making the hard, rigid resinous homopolymers or copolymers that constitute the resinous proportion of the blends of this invention. In preparing the graft, the ratio by weight of monomers to rubber ordinarily ranges from 60/40 to 30/70. Preferably the amount of resin-forming monomeric material used in making the graft is between 40 and 60% based on the weight of monomeric material plus rubbery spine. Most preferably the weight ratio of resin-forming monomers to rubbery spine in making the graft copolymer is about 50/50, since a remarkably advantageous combination of properties in the final blend, including particularly impact strength, is obtainable at about that ratio.

In certain preferred products the same resin-forming monomers are used in preparing the graft copolymer as in the separately prepared resin. The amount of separately prepared resinous polymer or copolymer in the blend is usually at least about 50% by weight of the resinous polymer or copolymer in the final blend.

In one aspect, blends of this invention are mixtures of resinous polymers or copolymers and rubbery graft copolymers which have been separately prepared by conventional methods and in which the overall final ratio of resin to rubber in the blends ranges from about 95/5 to 62/38 with a preferred range of 80/20 to 75/25. The use of separately prepared resinous homopolymers and/or copolymers in the blends of this invention offers certain advantages over the so-called "one-step" compositions which do not have separately prepared resinous homopolymers or copolymers. The composition, molecular weight, molecular weight distribution and the branching of the separately prepared resinous homopolymers and/or copolymers can be varied in order to better control such properties of the ultimate blends as transparency, heat distortion temperature, impact, flame resistance, gloss, die swell, flow and moldability. Thus the blended compositions using a single graft copolymer and different resinous components provide greater flexibility in composition which is not present in the "one-step" compositions.

Outstanding blends of this invention in which the resinous component is a styrene/acrylonitrile copolymer (the weight ratio of styrene to acrylonitrile usually being within the range from 80/20 to 65/35, preferably about 70/30 to 75/25) and the rubbery component is an ethylene-propylene-5-ethylidene-2-norbornene elastomer grafted with a mixture of styrene and acrylonitrile (in ratios as stated for the copolymer resin), are characterized by having a unique combination of resistance to hand flexure and high notched impact strength. As will be shown later, the resistance to hand flexure shows an unexpected increase with the Mooney viscosity (molecular weight) of the rubbery graft copolymer spine-the higher the Mooney viscosity, the higher the resistance to hand flexure especially at a Mooney viscosity (ML-4 at 257° F.) of at least about 55. Similarly, the high notched impact strength depends on the iodine number of the rubbery graft copolymer spine and must be at least 15 when the mixture of resin and rubbery graft copolymer is mixed under conditions of high shearing forces at elevated temperatures.

A test for resistance to hand flexure is performed by taking a sample of stock, extruded through a die with a rectangular cross-section of 0.125"×1.0", bending a section about 4 inches long initially through an angle of 180° upon itself, then immediately bending it through an angle of 360° in the reverse direction upon itself and repeating the process until fracture or the appearance of a crack on the surface of the bend indicates failure. The hand flex life is reported as the number of bends (including the first 180° bend) required to bring about failure; usually the results of about five such tests on separate specimens are averaged, to minimize experimental error. The larger the number of bends to failure, the higher the resistance to hand flexure. The compositions of the invention are remarkable for their ability to undergo an average of more than two flexings without failure.

Using styrene-acrylonitrile copolymer as the resinous component in the manner described makes it possible to achieve, in the blends of the invention, notched Izod impact strength greater than 2 foot-pounds per inch of notch and an average hand flex resistance greater than 2 in the test described. When the intrinsic viscosity of the resin in dimethylformamide at 30° C. is at least 0.65, blends having a notched Izod impact strength greater than 5 foot-pounds per inch of notch, an average resistance to hand flexure greater than 2, an ultimate tensile strength of at least 3,600 psi, a Rockwell R hardness of about 85 to 105, a percent gloss of from about 20 to 95, and a die swell of about 1.23 to 1.52 are readily attainable, as manifested by the working examples below. The compositions have good outdoor ageing.

The examples which follow illustrate the practice of the invention using two widely different methods of preparation of the graft copolymer, viz., a mass polymerization process and an aqueous slurry process. The rubbery terpolymers employed are commercially available EPDM elastomers containing 5-ethylidene-2-norbornene as the non-conjugated diene. The iodine number of the terpolymer may be determined by the method of Gardner et al., Rubber Chemistry and Technology, Vol. 46, page 1019 (1973).

EXAMPLE 1

This example employs a mass polymerization process to prepare the graft polymer and is summarized in Table I. Three different runs are made, using three commercially available EPDM's, coded EPDM (A), (B) and (C), each having a different Mooney viscosity and a high iodine number of 20. Run 1(c), which uses an EPDM [EPDM (C)] having a high Mooney viscosity of 68 (ML-4 at 257° F.), represents the practice of the invention. Runs 1(a) and 1(b) which use EPDM's (A) and (B) having lower Mooney viscosities of 26 and 47, respectively, are outside the invention and are included merely for purposes of comparison. Graft copolymers are made from each EPDM using a conventional mass polymerization process in which a mixture of 72 parts (all quantities are expressed herein by weight) of styrene monomer, 28 parts of acrylonitrile, 3 parts of Lupersol-11 (trademark; 75% t-butylperoxy pivalate in mineral spirits from Pennwalt) and 1 part of Irganox 1076 (trademark; octadecyl-3,5-di-tert-butyl-4-hydroxyhydrocinnamate from Ciba-Geigy) is added to 100 parts of EPDM (ethylene-propylene-5-ethylidene-2-norbornene elastomer) which has been ground to a Tyler (trademark) mesh particle size of 3 and placed into a one (1) quart capacity soda bottle. The bottle is flushed with nitrogen, capped, immersed in a 40° C. water bath and shaken for 4 hours, after which the bottle is transferred to a 70° C. water bath which is heated to 90° C. and maintained at this temperature for 2½ hours. The resulting graft copolymer is recovered by breaking the bottle and is then dried overnight in a 50° C. vacuum oven to remove the small amount of residual unreacted monomers.

To make the blends, 47 parts of graft copolymer and 53 parts of resinous styrene-acrylonitrile copolymer (styrene/acrylonitrile ratio 72/28) having an intrinsic viscosity in dimethylformamide at 30° C. of 0.75 (Tyril 880; trademark, Dow Chemical) are mixed in a 00 Banbury (trademark) mixer operating at 180° C. for a total mixing time of twenty minutes. Test samples ⅛" thick for Izod notched impact testing, Rockwell hardness testing and tensile strength testing are compression molded at 350° F. and a pressure of 1,000 psi. For hand flex testing, extruded stock samples are made by grinding the blend to a Tyler mesh of 3, drying at 100° C. for one hour, and feeding the ground material to a Modern Plastics Machinery Corporation 1 inch diameter plastics extruder having a 1" by 0.125" Rheomix (trademark) die, catalog number 23-00-513, from Haake, Inc., which has been modified so that the slit width is adjustable from zero to 0.125 inch. The temperature profile of the extruder barrel is 350°, 375°, 400° F., and 400° F. at the die. The hand flex results are expressed as the average value for five tests. Specular gloss is measured on injection molded samples following ASTM D-523 procedure.

Die swell samples, all containing 47 parts of graft copolymer and 53 parts of resin, are first blended in a Rheocord (trademark) Type M Torque Rheometer made by Haake, Inc. and equipped with cam rotors. Mixing time is 10 minutes at 165° C. and 90 RPM. Die swell measurements are made by extruding the samples from a Sieglaff-McKelvey Rheometer made by Tinius Olson Testing Machine Company, Willow Grove, Pa. The die has a 1/16 inch diameter and a ¼ inch length. The temperature is 400° F. and the flow rate is 0.66 gm/min. The results are expressed as the ratio of extrudate diameter to die diameter.

Table I represents the pertinent data on the composition of the three different ethylidene norbornene rubbers [EPDM (A), (B) and (C)] that are used in making the graft copolymers in runs 1(a), 1(b) and 1(c), the composition of the blends therefrom and the physical properties of the blends.

It is quite apparent from the data that blend 1(c) of the invention exhibits a unique combination of properties, specifically tensile strength, notched impact strength, hardness and unexpectedly a high resistance to hand flexure.

Table I

| MASS POLYMERIZATION | | | |
|---|---|---|---|
| Run: | 1(a) | 1(b) | 1(c) |
| Elastomer in Graft (Code): | (A) | (B) | (C) |
| % Ethylene | 57 | 58 | 60 |
| % Propylene | 33 | 32 | 30 |
| Iodine Number | 20 | 20 | 20 |
| % Ethylidene-2-Norbornene | 10 | 10 | 10 |
| ML-4 at 212° F. | 42 | 69 | 91 |
| ML-4 at 257° F. | 26 | 47 | 68 |
| Composition of Blend (parts by weight) | | | |
| Graft | 47.0 | 47.0 | 47.0 |
| Elastomer in Graft | 24.0 | 23.5 | 24.0 |
| Resin in Graft | 23.0 | 23.5 | 23.0 |
| Resin Added to Graft | 53.0 | 53.0 | 53.0 |
| Total Resin | 76.0 | 76.5 | 76.0 |
| Total Elastomer | 24.0 | 23.5 | 24.0 |
| Properties of Blend | | | |
| Hand-Flex (average of 5 tests) | 1.2 | 2.0 | 5.8 |
| Rockwell Hardness, R | 84 | 84 | 86 |
| ⅛" Izod Notched; Ft. lbs/In. | 5.9 | 7.6 | 9.3 |
| % Gloss | 73 | 78 | 37 |
| Tensile, psi | 3075 | 3275 | 3855 |
| Die Swell | 1.44 | 1.26 | 1.23 |

EXAMPLE 2

This example employs a slurry polymerization process to prepare the graft copolymer and is summarized in Table II. The invention is represented by run 2(c) which uses the previously described high Mooney (and high iodine number) spine rubber, EPDM (C). Runs 2(a) and 2(b) using lower viscosity EPDM's (A) and (B), respectively, are outside the invention and are included merely for purposes of comparison.

As in Example 1, the blends are made by first forming the graft copolymer and then blending the graft copolymer with the described additional, separately prepared styrene-acrylonitrile resinous copolymer (Tyril 880).

The graft copolymers are made using a slightly modified slurry polymerization process based on the procedure of Example 3 of Japanese patent 48/32189 as follows:

A 10-gallon jacketed autoclave equipped with a thermometer and a motor stirrer is charged with 413 parts by weight of water, 0.27 part by weight of Methocel K-100 (trademark; hydroxypropyl methylcellulose produced by Dow Chemical Company), 100 parts by weight of ethylene-propylene-5-ethylidene-2-norbornene copolymer which has been ground to a Tyler mesh particle size 3, and a mixture of 75 parts by weight of styrene, 40 parts by weight of acrylonitrile, 3 parts by weight of Lupersol-11, and 1 part by weight Irganox 1076.

The reaction mixture is heated to 80° F. for 1½ hours and then to 240° F. and kept at this temperature for another 1½ hours at which time the reaction mixture is cooled to room temperature and the graft copolymer recovered by filtering and drying overnight in an oven at 66° C.

Three graft copolymers prepared in the foregoing manner, using EPDM's (A), (B) and (C), are blended with the Tyril 880 styrene/acrylonitrile resin as in Example 1, and test specimens are prepared as described in Example 1. Results of the tests are shown in Table II. Again, as in the blend containing graft copolymer made by the mass polymerization process, the blend based on graft copolymer made by the slurry polymerization process using the high Mooney EPDM (C), namely, Run 2(c), exhibits a unique combination of high tensile strength, high notched impact strength, hardness and an unexpectedly high hand-flex value.

Table II

| SLURRY POLYMERIZATION | | | |
|---|---|---|---|
| Run: | 2(a) | 2(b) | 2(c) |
| Elastomer in Graft (Code): | (A) | (B) | (C) |
| % Ethylene | 57 | 58 | 60 |
| % Propylene | 33 | 32 | 30 |
| Iodine Number | 20 | 20 | 20 |
| % Ethylene-2-Norbornene | 10 | 10 | 10 |
| ML-4 at 212° F. | 42 | 69 | 91 |
| ML-4 at 257° F. | 26 | 47 | 68 |
| Composition of Blend (parts by weight) | | | |
| Graft | 47.0 | 47.0 | 47.0 |
| Elastomer in Graft | 24.0 | 24.4 | 23.5 |
| Resin in Graft | 23.0 | 22.6 | 23.5 |
| Resin Added to Graft | 53.0 | 53.0 | 53.0 |
| Total Resin | 76.0 | 75.6 | 76.5 |
| Total Elastomer | 24.0 | 24.4 | 23.5 |
| Properties of Blend | | | |
| Average Hand-Flex (5 tests) | 1.8 | 1.8 | 2.8 |
| Rockwell Hardness, R | 96 | 93 | 92 |
| ⅛" Izod, Notched; Ft. lbs/In. | 10.4 | 10.6 | 15.7 |
| % Gloss | 48 | 44 | 36 |
| Tensile, psi | 4435 | 4385 | 4625 |
| Die Swell | 1.49 | 1.58 | 1.52 |

Additional hand-flex data obtained in the manner described in Examples 1 and 2, but using, to make the blend, graft copolymers based on three additional commercial ethylene-propylene-5-ethylidene-2-norbornene terpolymer rubbers, designated as EPDM's (D), (E) and (F), having Mooney viscosities of 36, 60 and 78 (ML-4 at 257° F.), respectively, further confirm the results of Examples 1 and 2 with respect to the dependancy of hand-flex life on Mooney viscosity. Table III summarizes such additional data, along with data of Examples 1 and 2.

Table III
Summary of Hand-Flex Results

| EPDM used in graft for making blend | ML-4 257° F. Mooney viscosity of EPDM | Graft process used | Hand-flex (average of 5 tests) |
|---|---|---|---|
| A | 26 | mass | 1.2 |
| B | 47 | mass | 2.0 |
| C | 68 | mass | 5.8 |
| D | 36 | mass | 1.2 |
| E | 60 | mass | 2.8 |
| F | 78 | mass | 6.8 |
| A | 26 | slurry | 1.8 |
| B | 47 | slurry | 1.8 |
| C | 68 | slurry | 2.8 |
| D | 36 | slurry | 1.0 |
| E | 60 | slurry | 3.0 |
| F | 78 | slurry | 6.0 |

It will be seen from the data in Table III that the hand-flex properties exhibit a strong, non-linear relationship with the 257° ML-4 Mooney viscosity of the EPDM used in making the graft on which the blend is based, with the hand flex increasing with increasing viscosity. This relationship holds true both with graft made by mass polymerization, and graft made by slurry polymerization. Thus the hand flex-Mooney viscosity relationship is seen to be independent of the method of the graft polymerization process.

Regression analyses may be run in order to define the functional relationship between hand flex and Mooney viscosity. The relationship for each of the two methods of graft copolymerization can be described by quadratic functions which are shown as dashed lines in the graphs of FIG. 1 and FIG. 2 in the drawings. The individual results of five hand flex tests at each Mooney viscosity are used to determine this function. A measure of the significance of this functional relationship can be expressed by the well-known statistical "F ratio" which in both cases is more than fifty—60.6 for the mass polymerized graft copolymer based blends and 51.8 for the slurry polymerized graft copolymer based blends. These values of the F ratio indicate that there is less than one change in 10,000 that these relationships are accidental.

From an inspection of the two graphs in FIGS. 1 and 2 it is also apparent that the unusual and totally unexpected relationship is independent of the polymerization process used in making the graft copolymers. It is therefore possible to ignore the processes and combine the data and still retain the observed effect. The combined data is also represented by a quadratic function which is shown as a dashed line in FIG. 3 and which has an even more significant F ratio of 91.7, further decreasing the chances that the relationship is accidental.

It is quite apparent from the quadratic function thus arrived at that the hand-flex properties are very strongly dependent on the Mooney viscosity above a value of about 55. Furthermore, a relatively small increase in the Mooney viscosity above about 55 results in a substantial increase in hand flex properties. A further improvement in hand flex properties can be made by employing rubbery spines with Mooney viscosities above a value of 80; the relationship shows no tendency for the hand flex properties to decrease with Mooney viscosity above 80.

The following Example 3 demonstrates another aspect of this invention, namely, the criticality of the iodine number of the rubbery terpolymer spine of the graft copolymer on the notched impact strength of the blends of this invention which have been subjected to high shearing forces that are generated during the initial phase of processing, i.e., during the mixing or blending of the resin and the rubbery graft copolymer at elevated temperatures. It has been found that when the shearing forces during the mixing cycle are high as for example in a twin-screw compounding extruder, then the iodine number in the blends of this invention must be at least 15 in order to obtain high notched impact strength. If the iodine number is below 15, for example about 10, then under the same conditions of shearing and temperature the notched impact strength is markedly reduced. The significance of this unexpected result is that in order to obtain blends exhibiting optimum resistance to hand flex and high notched impact strength, the Mooney viscosity (ML-4 at 257° F.) must be above 55 and the iodine number must be at least 15. Both parameters must be satisfied for a blend having the combination of the two physical properties specified.

EXAMPLE 3

As in Example 2, graft copolymers of styrene and acrylonitrile on ethylene-propylene-5-ethylidene-2-norbornene terpolymer rubbers are made using the described slurry polymerization process. Three runs are made, identified as runs 3(a), 3(b) and 3(c) using three different commercial EPDM's, namely, EPDM (C), (B) and (E) as shown in Table IV. Run 3(a), in which EPDM (C) having a high iodine number of 20 (as well as a high Mooney viscosity of 68 ML-4 at 257° F.) is used in making the graft, represents the practice of the invention. Run 3(b) using an EPDM of high iodine number but low Mooney viscosity (47 ML-4 at 257° F.), and Run 3(c) using an EPDM of low iodine number of 10 but high Mooney (60), are both outside the scope of the invention and are included merely for purposes of comparision. After preparing the graft copolymers by the method described in Example 2, each graft is blended with separately prepared styrene-acrylonitrile resin (Tyril 880) in a twin-screw compounding extruder using a barrel residence time of 90 seconds and a barrel temperature of 170° C. If desired, 2 parts of titanium dioxide (per 100 parts of blend) and 1.5 parts of a suitable conventional ultraviolet stabilizer, such as 2(2'-hydroxy-5'-methylphenyl)benzotriazole, may be included in the blend.

Table IV presents the pertinent data in the composition of the three different EPDM's used in making the graft copolymers, the composition of the blends therefrom, and the notched Izod impact strength, Rockwell hardness, and hand flex of the three blends.

It is quite apparent from Table IV that the blend of Run 3(a) based on a rubbery terpolymer spine [EPDM (C)] with an iodine number of 20 and a Mooney viscosity of 68 (ML-4 at 257° F.) exhibits a maximum notched impact strength which is significantly higher than that of the blend of Run 3(b) which is based on a rubbery terpolymer spine having the same iodine number but a lower Mooney viscosity. However, most importantly the blend of Run 3(c) which has a higher Mooney viscosity rubbery terpolymer spine but a lower iodine number, below 15, has a markedly lower notched impact strength. This demonstrates that the notched impact strength in the blends of this invention is strongly dependent on the iodine number of the rubbery terpolymer spine of the graft copolymer. The important consequence of this finding is that to obtain high resistance to hand flex and high notched impact strength, the rubbery terpolymer spine must have both a Mooney viscosity (ML-4 at 257° F.) of at least 55 and an iodine number of at least 15.

Table IV

| EFFECT OF IODINE NUMBER ON IMPACT STRENGTH | | | |
|---|---|---|---|
| Run: | 3(a) | 3(b) | 3(c) |
| Elastomer in Graft (Code): | (C) | (B) | (E) |
| % Ethylene | 60 | 58 | 63 |
| % Propylene | 30 | 32 | 32 |
| Iodine Number | 20 | 20 | 10 |
| % ENB | 10 | 10 | 5 |
| ML-4 at 257° F. | 68 | 47 | 60 |
| Composition of Blend | | | |
| Graft | 46.0 | 46.0 | 46.0 |
| Elastomer in Graft | 23.0 | 23.8 | 23.0 |
| Resin in Graft | 23.0 | 22.2 | 23.0 |
| Resin added to Graft | 54.0 | 54.0 | 54.0 |
| Total Resin | 77.0 | 76.2 | 77.0 |
| Total Elastomer | 23.0 | 23.8 | 23.0 |
| Properties of Extruder Mixed Blend | | | |
| Notched Izod Impact Strength (ft. lbs/In.) | 14.0 | 9.5 | 7.7 |
| Rockwell Hardness, R | 95 | 98 | 96 |
| Average Hand-Flex (5 tests) | 2.4 | 1.0 | 1.6 |

What is claimed is:

1. A thermoplastic graft copolymer composition characterized by high impact strength and high resistance to failure from flexing comprising a blend of two separately prepared copolymer compositions (A) and (B);
   (A) being a soft, rubbery graft copolymer formed by simultaneous graft copolymerization of:
      (a) monoethylenically unsaturated resin-forming monomeric material; and
      (b) a rubbery polymer spine consisting essentially of a copolymerizate of ethylene, propylene and 5-ethylidene-2-norobornene, the amount of said resin-forming monomeric material (a) grafted to the rubbery spine (b) being sufficient to provide a weight ratio of grafted resin to rubbery spine of at least 0.2;
   (B) being a resinous polymer separately prepared in the absence of the rubbery copolymer (b) by polymerization of monoethylenically unsaturated resin-forming monomeric material;
   wherein:
      the monomeric material (a) is a mixture of styrene and acrylonitrile in weight ratio of 80/20 to 65/35, the rubbery copolymer (b) is a terpolymer of ethylene, propylene and 5-ethylidene-2-norbornene in which the ratio of ethylene to propylene is within the range from 80/20 to 20/80, the Mooney viscosity of (b) is from 55 to 78 ML-4 at 257° F. and the iodine number of (b) is from 15 to 40, the amount of (a) being about 50% based on the weight of (a) plus (b), the separately prepared resin (B) is a copolymer of styrene and acrylonitrile in weight ratio of 80/20 to 65/35 having an intrinsic viscosity in dimethylformamide at 30° C. of at least 0.65, the amount of (B) in the blend being sufficient to provide an over-all ratio of resin to rubber in the range from 80/20 to 75/25, the said blend having a notched Izod impact strength greater than 5 foot-pounds per inch of notch, an average resistance to hand flexure greater than 2, an ultimate tensile strength of at least 3,600 psi, a Rockwell R hardness of about 85 to 105, a percent gloss of from about 20 to 95, and a die swell of about 1.23 to 1.52.

2. A thermoplastic composition as in claim 1 in which the said notched Izod impact strength maintains its high value even after subjecting the blend to intense shearing forces in a twin-screw compounding extruder at elevated temperature.

* * * * *